United States Patent
Ladd et al.

(10) Patent No.: US 7,687,094 B2
(45) Date of Patent: Mar. 30, 2010

(54) FROZEN DESSERT PRODUCT

(75) Inventors: David D. Ladd, Huttonville (CA); D. Hart Melvin, Toronto (CA); J. David Irvine, Oakville (CA)

(73) Assignee: Frozen North Trading, Inc., Oakville, Ontario (CA)

( * ) Notice: Subject to any disclaimer, the term of this patent is extended or adjusted under 35 U.S.C. 154(b) by 981 days.

(21) Appl. No.: 10/787,253

(22) Filed: Feb. 26, 2004

(65) Prior Publication Data

US 2006/0134274 A1   Jun. 22, 2006

(51) Int. Cl.
    A23G 9/00         (2006.01)
(52) U.S. Cl. .................... 426/548; 426/660; 426/524
(58) Field of Classification Search ............... 426/548, 426/660, 474, 524
    See application file for complete search history.

(56) References Cited

U.S. PATENT DOCUMENTS

| | | | |
|---|---|---|---|
| 3,572,257 A | 3/1971 | Minor et al. | |
| 3,647,478 A | 3/1972 | Minor et al. | |
| 4,374,154 A * | 2/1983 | Cole et al. | 426/565 |
| 5,126,156 A * | 6/1992 | Jones | 426/418 |
| 5,356,648 A | 10/1994 | Kortschot | |
| 5,394,705 A | 3/1995 | Torii et al. | |
| 5,403,611 A * | 4/1995 | Tomita et al. | 426/565 |
| 5,948,456 A | 9/1999 | Jones et al. | |
| 6,214,394 B1 | 4/2001 | Beer | |
| 6,436,454 B1 | 8/2002 | Cox et al. | |
| 6,510,890 B1 | 1/2003 | Paskach et al. | |
| 6,555,154 B2 | 4/2003 | Jones et al. | |
| 7,094,437 B2 | 8/2006 | Solorio et al. | |
| 2002/0144608 A1 | 10/2002 | Jones et al. | |
| 2003/0224095 A2 | 12/2003 | DuBois et al. | |
| 2004/0137126 A1 | 7/2004 | Solorio et al. | |
| 2004/0219269 A1 | 11/2004 | Cathenaut et al. | |
| 2005/0008754 A1 | 1/2005 | Sweeney et al. | |
| 2005/0072321 A1 | 4/2005 | Larsen | |
| 2005/0106301 A1 | 5/2005 | Jones | |
| 2005/0170054 A1 | 8/2005 | Czark et al. | |
| 2006/0008557 A1 | 1/2006 | Vanitallie et al. | |
| 2006/0013924 A1 | 1/2006 | Jones et al. | |
| 2006/0029710 A1 | 2/2006 | McPherson et al. | |
| 2006/0078651 A1 | 4/2006 | Esghipour | |
| 2006/0093714 A1 | 5/2006 | Nelson | |
| 2006/0105083 A1 | 5/2006 | Brooker et al. | |
| 2006/0115573 A1 | 6/2006 | Singer et al. | |
| 2006/0141102 A1 | 6/2006 | Fleming et al. | |
| 2006/0153961 A1 | 7/2006 | Solorio et al. | |
| 2006/0286248 A1 | 12/2006 | Anfinsen et al. | |
| 2007/0065552 A1 | 3/2007 | Jones et al. | |
| 2007/0092623 A1 | 4/2007 | Shimizu et al. | |

FOREIGN PATENT DOCUMENTS

| | | |
|---|---|---|
| ES | 2194558 | 11/2003 |
| KR | 20010076086 | 8/2001 |
| WO | WO 02/085130 | 10/2002 |
| WO | WO 02/094035 | 11/2002 |
| WO | WO 2005/077200 | 8/2005 |

OTHER PUBLICATIONS

Igoe, Robert et al. Dictionary of Food Ingredients Third Edition, Chapman and Hall 1996. p. 14.*
Clark, J.P., Developments in food freezing, Food Technology, (2002), 56 (10) 76-77 ISSN: 0015-6639.
Davies, F.S. et al., Gibberellic acid, fruit freezing, and post-freeze quality of 'Hamlin' oranges, HortTechnology, (2006), 16 (2) 301-305, 11 ref. ISSN: 1063-0198.
Yu Baoning, Application of liquid nitrogen freezing technology in production of ice cream, Food and Machinery, (2002), No. 3, 25-26, 4 ref. ISSN: 1003-5788.
Cal-Vidal, J. et al., Sorption kinetics of freeze-dried passion fruit juice. In 'Engineering and food. vol. 1. Engineering siences in the food industry' G[see FSTA (1986) 18 G4E13], (1984), pp. 509-518, 9 ref.
Buchmuller, J., Liquid nitrogen—a versatile refrigerating agent for the confectionery industry. CCB Review for Chocolate, Confectionery and Bakery, (1981), 6 (1) 5-8, 4 ref.

(Continued)

*Primary Examiner*—Lien Tran
*Assistant Examiner*—Kelly Bekker
(74) *Attorney, Agent, or Firm*—Thomas A. O'Rourke; Bodner & O'Rourke, LLP

(57) ABSTRACT

The present invention is directed to formulations premix utilized in pellet structured frozen dessert type product. The pelletized frozen dessert product is manufactured by introducing the premix into a body of a cryogen such that the premix is frozen rapidly. The invention elevates the melting temperature as well as the fusing temperature of the pellets such that the storage and serving temperatures of the pellets are similar to the bulk products. The invention utilizes the basic ingredients and names and flavors of bulk type frozen desserts. The pellet produced utilizing the pre-mix is stable at normal retail and home freezer situations. The formulation and manufacture of the pelletized dessert product is substantially different from bulk frozen desserts. The result is a product that maintains the desired individuality of the pellets while maintaining structure, such that fusing is inhibited at the storage and serving temperature.

44 Claims, No Drawings

OTHER PUBLICATIONS

Gomez-Pastrana Rubio, J. M., [Liquid nitrogen in the ice cream industry.] Alimentacion Equipos y Tecnologia, (2002), 21 (169) 39-43 ISSN: 0212-1689.
Taylor, R. I., A new cryogenic process for the food industry. Institution of Chemical Engineers Symposium Series, (1984), No. 84, 231-240.
Seftalioglu, Funda et al., The stability of aspartame in frozen milky desserts during storage, Doga: Turk Tarim ve Ormancilik Dergisi (1992), 16(4), 803-9 CODEN: DTOSEO; ISSN: 1010-7649.
Kebary, K. M. K. et al., Improving viability of bifidobacteria and their effect on frozen ice milk. Egyptian Journal of Dairy Science, (1998), 26 (2) 319-337, 46 ref. ISSN: 0378-2700.
Abd-El-Rahman, A. M. et al., Stabilizing effect of bacterial capsules in making frozen yogurt. Egyptian Journal of Dairy Science, (2000), 28 (2) 195-209, 22 ref. ISSN: 0378-2700.
Modular cryogenic freezer tunnel. Food Engineering International, (1985), 10 (March) 52.
Keller, S. E. et al., Formulation of aspartame-sweetened frozen dairy dessert without bulking agents, Food Technology (Chicago, IL, United States) (1991), 45(2), 102, 104, 106 CODEN: FOTEAO; ISSN: 0015-6639.
Beck, Kark M., Dietetic frozen-dessert formula, Ice Cream Trade Journal (1958), 54(No. 4), 84 CODEN: ICTJAM; ISSN: 0096-2031.
Merin, U. et al., Structural stability of fresh and frozen-thawed 'Valencia' (*C. sinensis*) orange juice. Journal of Food Science, (1984), 49 (6) 1489-1493, 1512.
Bonenko, Zh. N. et al., [Quick-frozen natural apple juice in plastics packs.] Konservnaya i Ovoshchesushil'naya Promyshlennost', (1983), No. 9, 19-20.
Anon. [Hot or cold . . . but what happens on the way home?] Eis oder heiss . . . und was passiert auf dem Heimweg? Verpackungs-Rundschau, (1994), 45 (3) 18, 20 ISSN: 0042-4307.
Sheu T Y et al., Improving survival of culture bacteria in frozen desserts by microentrapment. Journal of dairy science, (Jul. 1993) vol. 76, No. 7, pp. 1902-7. Journal code: 2985126R. ISSN: 0022-0302.
Kato, Yukiteru et al., Sweeteners for frozen desserts. Japan Fudo Saiensu (1987), 26(4), 42-8 CODEN: JAFSAA; ISSN: 0368-1122.
Kazakova, M. V. et al., Sucrose replacers for low-calorie ice cream, Kholodil'naya Tekhnika (1994), (3), 33-4 CODEN: KHTEAU; ISSN: 0023-124X.
Search Results dated May 31, 2007.

\* cited by examiner

FROZEN DESSERT PRODUCT

BACKGROUND OF INVENTION

This invention relates to a pelletized frozen dessert product that can be stored and consumed at regular frozen dessert temperatures while still maintaining its unique pellet structure.

BACKGROUND—DISCUSSION OF PRIOR ART

Field of the Invention

A pelletized frozen dessert product that is similar in flavor to a bulk frozen dessert product has entered the specialty market in recent years. Unfortunately, this product requires that the storage temperature for any period of time must be below about −34 to −40 degrees Celsius for optimal taste, storage and dispensing. Consequently, the storage demands of storing the frozen pellet in the range of about −34 to about −40 degrees Celsius has limited the distribution and market of this dessert product substantially.

The pelletized frozen dessert product although generally similar in taste to its comparable bulk frozen dessert is a unique product with its own particular characteristics. This frozen pellet can be manufactured utilizing existing premixes that are utilized in the bulk products, however it results in storage demands that require extreme storage conditions in order to maintain the unique physical structure of the product.

The present invention produces the pellets and provides a premix alteration methodology such that the frozen pellet can be stored in the storage conditions utilized for storage in the bulk frozen dessert market.

These alterations in the premix result in a pelletized frozen dessert product that can be a introduced into the general retail market without the necessity for specialized storage equipment or trained staff for distribution to the public.

BACKGROUND TO THE INVENTION

In order to properly understand the uniqueness of the patent a description of existing bulk frozen dessert and pelletized frozen dessert type products and their manufacture and storage and structure of the served product is presented.

Regular Bulk Frozen Dessert Products.

Bulk frozen dessert products are manufactured utilizing a liquid pre-mix. The particular pre-mixes have evolved to produce frozen products that meet the needs and demands of the market. These needs and demands are flavor and sweetness and creamy structure and the ability to be scooped and served within the temperature ranges of commercial and home freezer storage systems.

Flavors of frozen desserts range from the traditional flavors such as vanilla, chocolate and strawberry to a complex mix of different cookies and other ingredients as well as different fruit and other flavors. All flavors however, need to have the basic structure that makes them a frozen dessert.

The market basically expects a product with a familiar level of sweetness. In a bulk product the sweetness is partly a result of the need to add an ingredient to the pre-mix that alters the freezing point such that the desired structure and texture is obtained.

The structure is such that the served product must be soft enough that it is consumable with a fork or is capable of being scooped into a cone or other holder. This demands that the served product be soft enough to be eaten pleasantly at the required serving temperature.

The simplified process of manufacture is as follows. The pre-mix goes into a freezing barrel. When the pre-mix is in contact with the surface of the freezer barrel the premix starts to freeze. The freezing mix is removed from the cooling surface via a moving blade or paddle that mixes the frozen mix with the unfrozen mix. The process continues by mixing the freshly frozen pre-mix, with the remaining premix until a semi-frozen product results. The product at this point is about the consistency of soft ice cream.

A more complex description is as follows. Inside the freezing cylinder the liquid mix, with its suspended fat globules and colloidal proteins and carbohydrates and salts, is transformed into a highly viscous "foam"

Ice crystallizes from the continuous phase, transforming it into a thick syrup. Air cells form, and hydrophilic colloids absorb to their surfaces, stabilizing them. Fat globules become increasingly crystalline, and some of them coalesce, forming structure that supports the foam. As the product exits the freezer, it has about one half of its water frozen and has expanded up to about 100% in volume. The continuous phase is a thick syrup while the disperse consists of air cells and ice crystals and fat globules and casein micelles and other hydrocolloids. This makes ice cream a three-phase system: gaseous and solid and liquid. The agglomeration is a combination of small ice crystals and concentrated small pockets of unfrozen pre-mix and air. The concentrated pockets of premix are mostly a result of the freezing process concentrating the liquid such that its freezing point is further depressed.

The product is then removed and poured into bulk containers of the desired end size. The temperature is lowered such that the bulk product evolves to the solid frozen bulk. The product is stored at a recommended commercial temperature of from about −20 to −25 degrees Celsius, however, it can be stored at temperatures below that if the equipment is available.

When a bulk product is ready to be consumed it is tempered (warmed up) such that it again becomes smooth and creamy. This enables it to be scooped for cones, on pies etc. The ideal texture of a frozen dessert is a soft and creamy product that will stick together effectively.

At serving temperature the product is actually only about 70% to 80% frozen. The frozen aspects of the dessert create sufficient stability such that the remainder of the mix is held in place. Very much like mayonnaise holding its ingredients in a mix. The key part of this description is that the pre-mixes utilized for regular frozen desserts are about 80% frozen at recommended serving temperatures. The temperature of the dessert is from about −6 to about −10 degrees Celsius.

This is about the average temperature of a freezer connected to a fridge. Longer term storage in equipment such as a deep freezer or a commercial deep freezer results in a higher percentage of the dessert being frozen resulting in the characteristic spoon bending hardness of ice cream from the deep freeze.

The mixture also has air trapped in its texture; this can be significant with as much if not more than 50% of the volume of the finished product is air. The air will create a certain amount of product insulation such that it will inhibit heat transfer between the bulk of the frozen dessert and the ambient environment.

Frozen Dessert Pellets

The frozen dessert pellet is a unique product with its own particular characteristics, however the pre-mix historically utilized has been virtually the same as that utilized in a bulk frozen product. This has resulted in the requirement for the pellet to be stored and served at very low temperatures i.e., about −28.8 C. for short term storage, about −34 C. to about −40 C. for general storage and about −23 C. to about −28.8 C. for serving/consuming.

The pre-mix is introduced into a body of liquid cryogen (such as liquid nitrogen) as a series of small volumes of liquid (droplets). As a result of the significant difference in temperature the process of freezing is extremely rapid.

Unlike ice cream that is a three-phase product a frozen dessert pellet is completely frozen virtually immediately. This results in the finished product leaving the cryogen being completely or virtually solid.

The pellet exits the process in completely or virtually one phase, solid. When it is tempered it all melts at basically the same rate, as it was never differentiated into frozen aspect and a syrup phase when processed.

The liquid pre-mix is introduced into the body of a liquid cryogen as a small droplet. Upon entering the liquid cryogen, a crust or hard outer layer is immediately formed around the droplet. Freezing of the core is very rapid resulting in very small or virtually non existent ice crystals being formed. Depending upon the management of the liquid cryogen the pre-mix droplets can be formed into pellets with the following general characteristics:

1. The pre-mix will form a percentage of hollow shells with the contents freezing as new and smaller droplets.
2. A popcorn type product, which is basically the frozen explosion of the pellet.
3. Well formed, basically spherical in nature.
4. Random shapes, with the pellets being in various sizes, mostly as a result of post introduction fusing of forming pellets.

Since the freezing process is significantly different
1. The pellets do not have any air incorporated within its solid structure in the processing. This results in a frozen product that is 100% pre-mix.
2. There aren't any pockets of concentrated liquids and syrups with different freezing points within the structure of the solidified pellet.
3. The pellet is 100% frozen.
4. The pellet is only in one phase, that phase being solid.

The frozen pellet is simply, frozen pre-mix without the effects of the freezing and mixing process associated with the freezer barrel utilized for a bulk frozen dessert. In specific it does not have the three phase agglomerated structure of a bulk frozen dessert product.

As a result of the rapid freezing the pellet maintains the original ingredient flavors to a much greater extent.

When the pellet exits the processing system, the temperature of the product is at temperatures ranging usually from about −40 to about −60 degrees Celsius to very much colder. This exit temperature is partially dependent upon the process and management and retention time in the liquid nitrogen and the average size of the pellet. The physical appearance and structure of the product can be controlled to vary from a popcorn type product to a hollow sphere to a well formed sphere to random shapes. This is a function of the management of the Liquid Cryogen and the equipment.

After processing the finished product is sent to a storage system that is in general much warmer relative to the finished product. The pellets are usually in the range of about −60 Celsius and colder, while the standard storage temperature for bulk desserts is typically from about −25 degrees Celsius to about −40 degrees Celsius.

A finished pellet can be poured or handled as one would handle ball bearings or other generally small round solids. The total surface area, on per volume of premix utilized, is understandably much larger in surface area than a comparable amount of pre-mix utilized in a bulk product. The pellet is kept at the 100% solid state or very close to this single phase existence in order to maintain its structural integrity. When tempering occurs it occurs at a rather rapid rate as a result of its high surface area per unit of weight.

Once the pellet starts to melt, it immediately will stick to associated pellets resulting in fusing of the pellets into a mass or the complete loss of the pellet type structure.

Historically the required storage temperature has been required to be approximately about −34 to −40 degrees Celsius in order to prevent the fusing of pellets.

Specialized vending equipment and delivery systems have been developed in order to handle the product and hold it at these cold temperatures.

In order to prepare the product for serving tempering (warming up) is required. In spite of the fact that there aren't any regulations regarding the minimum temperatures that food can be offered to the public good practice dictates that food at about −34 to −40 Celsius cannot be given to a person to eat. If a food product is placed in a mouth at these temperatures cellular damage to the mouth can occur. The reason there is not a minimum temperature regulation is that food in general is not consumable at these cold temperatures. At these cold temperatures food is structurally very solid and cannot be scooped or bitten or chewed. So it is likely that the necessity for a regulation never existed.

The frozen dessert pellet because of its individual small size can be put in a mouth at any temperature. A pellet at about −34 to −40 Celsius or lower can be put into a mouth easily. At colder temperatures the cellular damage can just be worse.

Since there does not seem to be any guidelines as to the lowest legal temperature that food can be served, safety is left as a decision to the distribution company. The result is that trained staff is required to interact with the public.

The requirement of storing the pellets at these low temperatures limits their distribution and demands that it must be only handled for serving by trained staff.

As can be seen there are significant differences that exist between the frozen pellet and its comparable bulk frozen product.

1. The pellet has a higher density resulting from being 100% pre-mix.
2. The surface area on a per volume of premix basis is much higher in the pellet.
3. A given volume of frozen pre-mix will temper much more rapidly.
4. The pellet is in a single phase which is the solid phase.
5. Flavors will be better preserved.
6. The range of consumable temperatures is small.
7. The pellet must be tempered by trained staff.
8. The pellet must be maintained at temperatures close to about −34 to −40 degrees Celsius in order to maintain its structural integrity.

A pelletized frozen dessert is a unique product with the differences between the comparable bulk frozen dessert and a frozen pelletized dessert being significant.

Historically, a similar premix to a bulk product has been utilized for a pelletized frozen dessert type product. This demanded that in order to account for the many differences previously described the pellet had to be stored and handled at depressed temperatures.

A bulk product is in 3 phases with it being a consumable product at about −6 to −10 degrees Celsius. As the temperature of a bulk product increases percentages of the agglomeration change from a solid phase to a liquid phase. The bulk product melts in the same ratios as it was frozen.

The pellet, since it solidified immediately its frozen matrix will melt very much like a small chips of ice will melt.

What occurs with the present premixes utilized for this type of product is that the pellet must be stored at temperatures close to about −34 to −40 degrees Celsius. The pellet is served at as cold a temperature as possible without hopefully causing cellular damage in the mouth.

This cold serving temperature inhibits the flavor of the product. The tempering that is essential in advance of serving demands trained serving staff. These restrictions on the handling and serving the product has resulted in severely inhibiting the availability of the product to the general public. Availability has only been typically at special events or via trained serving staff.

Commercial storage facilities at about −34 to −40 degrees Celsius are limited. Trucks that can move a product at about −34 to −40 degrees Celsius are also limited. In store facilities available to the public at about −34 to −40 degrees Celsius are virtually non-existent. In addition −34 to −40 degrees Celsius storage demands expensive equipment and high running costs.

In order to introduce the small individual frozen dessert pellet to the existing market infrastructure it was essential to invent a premix that allows the pellet to exist as required at the temperatures utilized in the storage of bulk frozen dessert products.

The solution is to alter the premix formulation such that a higher percentage of the pellet is in a solid phase at standard storage temperatures of the recommended serving temperatures.

SUMMARY OF THE INVENTION

The present invention is directed to an improved frozen dessert pellet that could utilize the existing storage and handling facilities presently utilized for bulk frozen dessert products. In order to achieve this, an improved premix has been developed. The frozen pellets made from the premix of the present invention have the following characteristics:
1. The pellet is preferably a solid between about −15 and about −25 degrees Celsius.
2. The pellet softens on melting and does not melt like an ice chip.
3. The melting point of the pellet is preferably approximately −6 to −10 degrees Celsius.
4. There is also inhibition of fusing of pellets once melting temperature is initiated.

The present invention is directed to a superior premix utilized in a bulk frozen dessert product. The unique premix raises the freezing point of the premix which subsequently raises the melting point of the frozen premix. In addition the additives that are included inhibit the undesirable structural breakdown of the pellet once melting or softening of the pellet is initiated.

The invention is also direct to a frozen dessert pellet made from the premix that can be stored in conventional commercial facilities at the temperature ranges utilized for bulk frozen dessert products, i.e., being approximately −20 to −25 degrees Celsius. The storage temperature of the pellets made from the present invention is significantly higher than the storage temperature of prior art pellets made in cryogenic apparatus. In addition, the invention results in a pelletized frozen dessert product that can be stored at the temperatures of a home deep freezer being from about −15 to −18 degrees Celsius and the home fridge type freezer of about −6 to −10 degrees Celsius.

The pelletized frozen dessert product will maintain its basic structural integrity and individuality at these storage temperatures.

More specifically, in order to introduce pelletized frozen dessert products into the general retail market, it is essential that the product quality and unique features be maintained within the existing storage, distribution and serving temperatures utilized for bulk frozen dessert products, that are standard to the industry. In addition the product must maintain its unique features in the frozen storage systems that exist in households.

In a preferred embodiment the present invention includes a composition that remains frozen in the following:
1. Commercial refer freezer truck temperatures ranging from about −18 to −20 degrees Celsius.
2. Commercial ice cream freezer trucks ranging from about −26 to −28 degrees Celsius.
3. Commercial freezers in warehouses utilized by commercial facilities.
4. Retail store freezers that are presently utilized to store and as point of sale freezers for bulk frozen desserts. This temperature range being generally from about −25 to −30 degrees Celsius.
5. Home deep freezers systems being in the range of about −15 to −18 degrees Celsius.
6. The home freezer associated with a fridge. This temperature range being generally from about −6 to −10 degrees Celsius.

The present invention relates generally to a unique formulation of premixes utilized in the manufacture of pelletized frozen dessert products that will be stable in the foregoing temperature ranges.

More specifically, the formulation of a premix, is such that the pellet is substantially the same flavor as its' comparable bulk frozen dessert.

In addition the frozen pellets will maintain the desired structure when taken home by the consumer and stored in a household fridge freezer system. Providing they are only exposed to the ambient environment in the same manner as regular bulk frozen desserts are exposed.

Although the term "freezing point" is utilized in the frozen dessert science with pelletized frozen dessert products the important temperature points are as follows.

There are two main temperature points in connection with the present invention.
1. The melting point of the pellet.
2. The fusing temperature of the pellet.

The melting point is the temperature at which the product begins to melt. The mix of solids in the pellet is basically homogeneous and is in a single phase. By single phase is meant being a homogeneously frozen solid in which the premixed fluids are frozen very rapidly in a cryogen in small volumes and hence remain in the same homogeneous state as they were in the liquid pre-mix. The bulk product which is in three phases and is an agglomeration has multiple melting points within its structure as each agglomerate piece will have its own melting point. By three phase is meant gas, liquid and solid. Gas is the ambient air incorporated into the pre-mix as it is being frozen in a freezing barrel by the action of the paddles or blades. The liquids are those fluids that have not frozen during the slow freezing process and remain as such following said manufacturing process. The solids are those liquids that have solidified during the manufacturing/freezing process.

The temperature at which part of the single phase product initiates melting is the temperature at which virtually all of the product structure initiates melting because unlike the three phase product that melts on a gradient, the homogeneous single phase product initiates melting all at the same time because it is homogeneous and has not been differentiated or concentrated.

The fusing temperature is the temperature at which the pellet becomes sufficiently soft so that the pellet will now stick to adjacent pellets and they will stick together. The result being that the pellets start to agglomerate into a mass, thereby losing its individuality of the pellet.

Freezing point of the product is usually not a significant term in the manufacture of these frozen dessert products as the product is manufactured in a cryogen such as Liquid Nitrogen and freezing is extremely rapid with the pellet actually going into storage following the freezing process at a temperature usually much higher than when it is harvested from the freezing equipment.

Although the science refers to freezing point it is assumed that in general a freezing point is considered the same temperature as a melting point.

According to Raoult's Law, the greater the percentage of a solute in a liquid the lower the vapor pressure of the solution and the lower the freezing point of the solution. Conversely, the lower the percentage of solute in the solution the higher the vapor pressure and subsequently the higher the freezing point of the solution.

The vapor pressure of a solution is directly related to the freezing point of the product.

Thus, raising the vapor pressure of the premix subsequently raises the freezing point of the premix.

The raising of the freezing temperature of the premix subsequently raises the melting point of the pellet.

Raising the melting point of the pellet subsequently raises the fusing as well as the melting temperature point of the pellet.

The formulation of the present invention is such that the average melting temperature of the frozen product is raised as a result of raising the vapor pressure of the premix. This results in a pellet that can be stored and served at a comparable temperature to a bulk frozen product. Those comparable products being Ice Cream, Sorbet, Water ice, Ice Milk, Frozen Yogurt and similar type products.

The primary ingredient that alters the freezing point of a premix is the quantity of sugar in solution. Additional materials in solution also adjust the freezing point as well, however the primary freezing point altering ingredient is the sugars present. Within the context of this invention and the product quality desired the melting point is more important than a freezing point, however essentially these temperature are the same.

The fusing point is also a useful term in relation to this invention as the goal was to produce a frozen dessert pellet that will maintain its structural integrity when handled and served at recommended temperatures similar to those utilized for bulk frozen desserts.

Various stabilizers are added to the premix in the form of edible gums, depending upon the product being manufactured. As a result when the pellet is in the range of its melting point this causes the product to soften a little yet the pellet will continue to maintain its basic structure.

The elevation of the melting temperature and fusing point takes into account a variety of important factors.

1. The surface area of the product on a volumetric basis is substantially higher than its comparable bulk product.
2. The heat transfer within the product itself is faster as the pellet does not have the advantage of air mixed with the product to inhibit heat transfer.
3. The product although desired to be firm, must be sufficiently soft that it can be consumed as a pleasant dessert and not as a hard pellet of ice.

More specifically, to the formulation for preparing the premix of a pellet type product, the actual formulation will differ from product to product as flavorings, juices and other ingredients are required. The reason for this is that all of these individual ingredients will have some effect upon the overall freezing point and subsequently upon the overall fusing and melting point of the product.

The premix alterations result in maintaining the individual pellet integrity of the pelletized frozen dessert product at the desired temperatures.

In order to manufacture any acceptable frozen dessert it demands that a certain sweetness be present in the product. A variety of sugars provide this desired sweetness by the consumer.

Additionally stabilizers in the form of edible gums are added to the premix such that upon initial melting the gums assist in stabilizing a structure and allowing it to soften a little near its melting point yet preventing it from losing its basic structure at that point.

The frozen pellet maintains its structural integrity and can be stored at the storage temperature of bulk frozen desserts, that storage temperature being from about −20 degrees Celsius to −25 degrees Celsius.

The pelletized frozen dessert will maintain its structural integrity in the home deep freezer temperatures of approximately about −15 to −18 degrees Celsius.

The pelletized frozen dessert will maintain sufficient structural integrity in the home fridge freezer temperatures of about −6 to −10 degrees Celsius even though it may soften at these temperatures.

The higher melting point combined with the gum stabilizers provide a synergistic result such that the structure is enhanced providing the desired pellet that can be presented and marketed within the infrastructure that exists for marketing and distribution of bulk frozen desserts.

DETAILED DESCRIPTION OF THE INVENTION

In order to manufacture a frozen dessert type product a premix is required. Currently available premixes typically have the following composition:

At least 10% milk fat with some premium ice creams going as high as 16%, or even 18% in super-premium ice creams. In addition to the milk fat there is also about 9% to 12% non-fat milk solids as well as about 12% to 18% sweeteners. These sweeteners are usually a cost-optimized combination of sucrose and corn sweeteners. There is also about 0.2% to 0.5% stabilizers and emulsifiers. The remainder of the formulation, typically about 55% to 64% is water, contributed primarily by the milk. It will be appreciated that there are numerous different recipes for ice cream. However, to be categorized an ice cream there must be at least 10% fat contained within the composition. Other ratios typically would be 11% for non-fat milk solids, 14% for sugars, egg yolk solids 0.5% and stabilizer additives no more than 0.5% by law. Many commercial ice cream manufacturers utilize dried egg yolk, powder skim milk, cane sugar, water (for reconstituting the powdered ingredients) and very inexpensive gums to produce product. Although current low calorie, lowered sugar or no sugar added bulk pre-mixes utilize sugar replacement products to maintain desired sweetness they are formulated to create the normal freezing characteristics and lowered vapor pressure of a regular bulk frozen pre-mix that has sugar added. Bulking agents are necessary to maintain the processing and post processing characteristics that are essential to a bulk ice cream products such as for example scoopability and mouth feel. These bulking agents, such as malto dextrin (sugar derivative) for example, lowers the vapor pressure of the pre-mix and thereby lowers the freezing temperature resulting in attaining the required freezing characteristics of a bulk frozen product.

In a preferred embodiment of the present invention the premix uses fresh milk and cream and stabilizers such as agar. In addition, the composition of the present invention does not require the presence of bulking agents such as malto dextrin because the sugar content is reduced.

An existing infrastructure exists within the distribution system and the commercial and retail storage system to maintain frozen desserts.

In addition, an infrastructure of freezing storage equipment exists within the consumer market as well consisting of the home deep freezer as well as the freezer associated with a home refrigeration system.

A pelletized frozen dessert product is typically manufactured by introducing small volumes of a premix into a body of a cryogen such as liquid nitrogen. Historically the premix utilized for this type of pelletized frozen dessert product has utilized standard premixes utilized in bulk frozen dessert type products. The utilization of this premix demanded that the frozen pellet thus made be stored at temperatures in the range of about −34 to −40 degrees Celsius. This storage temperature demands specialized freezing equipment not generally available in the retail distribution infrastructure and in addition not available in the consumer environment.

The storage temperatures generally encountered in the retail distribution market are as follows:

Commercial retail storage is in the range of about −20 to −25 degrees Celsius.

Home freezer storage in a standard deep freeze being in the range of −15 to −18 degrees Celsius.

Home fridge type freezer storage in a freezer associated with a home refrigeration system being in the range of about of −6 degrees to −10 degrees Celsius.

In order to make this specialized unique product available to the general retail market it was essential to develop a premix that could be utilized in the manufacture of a pelletized frozen dessert product that could maintain its structural integrity within the existing freezer infrastructure.

The development of this invention enables the pelletized frozen dessert product to be distributed within the existing retail commercial infrastructure as well as within the standard home freezer storage systems of the consumer market.

The main object of the invention is to elevate the melting temperature of the frozen pellet. This melting temperature is higher than the comparable melting temperature of a bulk frozen dessert product. The elevation of the melting temperature is achieved by removing a significant percentage of the sugar in the normal premix while still retaining the preferred taste of the product. Alternatively all added sugars can be removed completely and replaced with artificial sweeteners if desired for a composition that is sugarless. Accordingly, that significant percentage removed can range from about 30% to about 70% of the sugar normally in a premix. In a preferred embodiment the sugar removed ranges from about 40% to about 60%. In a more preferred range the removed sugar can range from 45% to about 55%.

In the most preferred embodiment there is removal of about 50% of the sugar in a standard premix Quantitatively, Raoult's law states that the solvent's vapor pressure in solution is equal to its mole fraction times its vapor pressure as a pure liquid, from which it follows that the freezing point depression and boiling point elevation are directly proportional to the molality of the solute, although the constants of proportion are different in each case.

Although Raoult's Law does predict a raising or lowering of the freezing point of a Solution subject to the alteration of its vapor pressure, this invention is in specific not an extension on this law. This is because the pellet is frozen extremely quickly and taken to a temperature well below the freezing point of any pre-mix, in an environment of a liquid cryogen. Subsequently the freezing point of the pre-mix is not a factor that is even considered.

The cryogen freezing process is an essential factor in the frozen pellet structurally existing at the desired elevated melting temperatures. As a result of the rapid and very cold freezing of the pellet the ice crystallization is minimized and the pellet produced is a single phase product, unlike the multiple phase product of bulk frozen deserts.

The result of the rapid freezing achieved in the cryogen is a single phase pellet that is generally homogeneous in nature. The rapid freezing also results in a pellet with minimal crystallization. It is this minimal crystallization as a result of the rapid freezing that results in a pellet that has not separated into multiple phases during the freezing process as occurs in all bulk product manufactured. It is this single phase structure of the pellet that assists in its ability to stay stable at the elevated melting point of the pellet.

The elevated melting point is a direct result of the pellet structure combined with stabilizers, typically being the food grade gums added to the pre-mix which allows for the existence of a pellet that can softened because of partial melting, yet it does not flow like melting ice chips as the stabilizers/ gums act to inhibit this natural action.

The invention comprises formulation alteration including the addition of food grade gums as stabilizers added to the pre-mix and subsequently processed in a liquid cryogen, such as liquid nitrogen, results in a frozen dessert pellet that meets the requirements essential for a frozen dessert pelletized product that remains stable within the existing bulk frozen dessert infrastructure.

In order to maintain consumer preferences and desired sweetness profiles the pelletized frozen dessert of the present invention preferably requires the addition of sweetness to compensate for the significant lowering of the sugar content.

This is achieved by the utilization of artificial sweeteners. Accordingly, these artificial sweeteners are preferably products such as Sucralose or Aspartame and the like.

In the preferred embodiment the sweetness level of the invention's pelletized frozen dessert product is maintained in the range of about 13% to 17% of the amount of sucrose typically present in a frozen dessert product.

In general, Sucralose provides about 600 times the sweetness in sucrose equivalency.

The preferred embodiment is the utilization of Sucralose. The sucrose equivalency is about 1 unit of Sucralose is added to the premix for every 600 units of sucrose or any equivalent in sweetness that has been removed.

An additional embodiment is the addition of Aspartame which provides 200 times in sucrose equivalent.

The sucrose equivalency is about 1 unit of Aspartame is added to the premix for every 200 units of sucrose or any equivalent sweetness that has been removed.

There are other artificial sweeteners that are currently available or that will potentially be available in the future. Whatever their sucrose equivalence is or potentially would be would hence call for the appropriate replacement ratio to attain the desired sweetness. Current available artificial sweeteners include but are not limited to the following examples. Examples: Sucralose, Aspartame, Saccharin, Acesulfame K.

An additional embodiment is a combination of Sucralose and Aspartame in order to minimize any background disagreeable taste provided by the addition of an artificial sweetener to a food product.

Accordingly that depending upon the particular flavor of the frozen desert desired the sweetness level will vary. For example a frozen dessert product such as a vanilla ice cream pre-mix with a total sugar content of 15% to 17% of the pre-mix, an approximate replacement of about 50% of those sugars would require a sucralose replacement in the range of about 0.025% to about 0.075% depending upon sweetness preference, A preferred sucralose replacement range would be from about 0.03% to about 0.07% with a most preferred range being from about 0.04% to about 0.06%.

Accordingly a chocolate frozen product demands a higher level of sweetness to counteract the harshness of the Cocoa utilized in the mix compared to a vanilla type frozen dessert product. The chocolate frozen dessert pre-mix would hence call for a sucralose replacement of sugars in the range of about 0.075% to about 0.16% depending upon sweetness preference. A preferred sucralose replacement range would be from about 0.08% to about 0.15% with the most preferred being from about 0.09% to about 0.11%.

Accordingly, frozen dessert type products such as ice cream, sorbet, water ice, ice milk, frozen yogurt and similar type products all must be first formulated as pre-mixes with sugar replacement and stabilizer additions added prior to the cryogenic freezing process. This pre-mix formulation combined with the single phase structure of the pellet that results from the cryogenic freezing process results in being able to achieve the desired melting and fusing points necessary for compatibility with the existing frozen bulk food handling and storage infrastructure. Accordingly the sugar removal and the addition of sweetener will vary in relation to the flavor desired. The reason being that, various fruit flavors will provide an alteration in the freezing point and subsequently the melting point of the frozen pellet.

Accordingly the variances necessitate the removal of more sugar or less sugar and the relative balancing of sweetness with the artificial sweeteners. The preferred embodiment of the invention is to vary the removal of sugar and then utilize artificial sweeteners to reestablish the desired sweetness of the pelletized frozen dessert product.

Accordingly the pellet can be served when it has become partly softened. In order to maintain its structure a stabilizer in the form of a food grade gum is added to the premix. Current stabilizer gums include but are not limited to the following examples. Examples: guar gum, carob bean gum, mono+diglycerides, sodium alginate, agar. Stabilizer gum ranges for a Vanilla ice cream pre-mix depending upon the preferred texture would be from about 0.25% to about 0.60% with a preferred range from about 0.35% to about 0.55% and a most preferred range being from about 0.40% to 0.50%. For a chocolate ice cream premix the range depending upon the preferred texture would be from about 0.20% to about 0.50% with a preferred range of about 0.30% to about 0.45% and a most preferred range being from about 0.35% to about 0.44%.

Accordingly the addition of a stabilizer assists in maintaining the desired individual structure of the pellet.

Accordingly the stabilizer also inhibits fusing of the pellets when the pellet is close to the range of its melting point.

A preferred embodiment of the invention is that since the pelletized frozen dessert can now be stored at an elevated temperature the necessity of trained staff to temper the pellet to a safe temperature is not longer required.

Accordingly the safety of the pellet by avoiding potential cellular damage to the consumers mouth is achieved.

This invention of raising the freezing temperature of the premix which subsequently raises the melting point of the pelletized frozen dessert product with the subsequent addition of a stabilizer to assist in maintaining the structural integrity of the pellet when at preferred serving temperatures achieves the desired results.

The desired results being able to distribute a pelletized frozen dessert product within the existing infrastructure utilized for bulk frozen desserts.

In addition the raising of the storage temperature required removes the potential of cellular damage occurring in the mouth of the consumer. This removal of a serious safety concern enables the frozen pelletized dessert product to be a generally available dessert product rather than a specialized frozen dessert with expensive and cumbersome or almost impossible distribution demands.

What is claimed is:

1. A frozen dessert product comprising a single phase pellet said single phase being a solid phase, said pellet consisting essentially of a premix comprising 6% to 7.5% sugar content, and 0.025% to about 0.075% artificial sweetener, said pellet resulting from said premix being introduced into a cryogen as a small individual volume of liquid, then completely freezing, said pellet remaining in a pellet form at a temperature of from −20° C. to about −5° C. without fusing to another pellet, and wherein the frozen dessert product does not contain air.

2. The frozen dessert product according to claim 1 wherein said pellet does not fuse to another pellet while said pellets remain a single phase product.

3. The frozen dessert product of claim 1 wherein said pellet consists of premix without the presence of a bulking agent.

4. The frozen dessert product according to claim 1 wherein said single phase pellet remains frozen at a temperature of about −18° C. to about −20° C.

5. The frozen dessert product according to claim 1 wherein said single phase pellet remains frozen at a temperature of about −15° C. to about −18° C.

6. The frozen dessert product according to claim 1 wherein said pellet has a melting temperature of about −5° C. to about −10° C.

7. The frozen dessert product according to claim 1 wherein said single phase pellet remains frozen at a temperature of −18° C. to −20° C.

8. The frozen dessert product according to claim 1 wherein said single phase pellet remains frozen at a temperature of −15° C. to −18° C.

9. A method of forming a single phase dessert product, the method comprising the steps of:
   introducing a premix into a body of liquid cryogen as a small individual volume of liquid to form a single phase palletized dessert product wherein said pelletized dessert product does not contain air and consists of a premix without the presence of a bulking agent;
   said small individual volume of liquid completely freezing after it is introduced to said body of liquid cryogen to form a solid phase pellet consisting essentially of premix;
   said premix comprising an artificial sweetener in the amount of about 0.025% to about 0.075% of the premix; and
   further wherein the single phase dessert product, can be stored at a temperature of from −20° C. to about −5° C. while remaining in a solid phase.

10. The method of claim 9, wherein the premix further comprises a sucrose or sucrose equivalent content of about 6.0% to 7.5% of the premix.

11. The method of claim 10, wherein the sweetener is sucrose or a corn sweetener.

12. The method of claim 9, wherein the artificial sweetener is sucralose, aspartame, saccharin, acesulphame K and combinations thereof.

13. The method of claim 9, wherein the dessert product is ice cream, sorbet, sherbet, water ice, ice milk or frozen yogurt.

14. The method of claim 9, wherein the premix contains from about 0.03% to about 0.07% artificial sweetener.

15. The method of claim 9, wherein the premix contains from about 0.04% to about 0.06% artificial sweetener.

16. The method of claim 9, wherein the premix contains 0.025% to about 0.075% sucralose.

17. The method of claim 9, wherein the pelletized dessert product can be stored at a temperature of from about −5° C. to about −10° C.

18. A pelletized dessert product produced by the method of claim 9, wherein said dessert product does not contain air and can be stored at a temperature of from about −5° C. to −20° C. while maintaining a pelletized structure.

19. A frozen dessert product comprising a single phase pellet formed from a premix comprising from 3.6% to 7.2% sugar, said pellet resulting from said premix being introduced into a cryogen, said pellet consisting essentially of premix and remaining a single phase solid product at a temperature of from between about −15 and −20 degrees Celsius without fusing to another pellet, and wherein the frozen dessert product does not contain air.

20. A frozen dessert product comprising a single phase pellet formed from a premix, said premix containing no bulking agents, said premix comprising from 7.5% to 8.5% total sucrose and sucrose equivalent content said pellet resulting from said premix being introduced into a cryogen, said pellet consisting essentially of premix and remaining a single phase product at a temperature of −20 degrees Celsius to about −5 degrees Celsius without fusing to another pellet, and wherein the frozen dessert product does not contain air.

21. A method of forming a frozen dessert product comprising introducing small individual volumes of liquid of a premix, containing no bulking agents, into a cryogen said premix comprising from 7.5% to 8.5% total sucrose and sucrose equivalent content, said premix forming said frozen dessert product in a single phase pellet in said cryogen, said pellet consisting essentially of premix, said pellet remaining a single phase product at a temperature from −20 degrees Celsius to about −5 degrees Celsius, and wherein the frozen dessert product does not contain air.

22. A method of forming a single phase dessert product, the method comprising the steps of:
   Introducing a premix into a body of liquid cryogen to from a single phase pelletized dessert product, said premix containing no bulking agent;
   Said premix comprising an artificial sweetener in the amount of about 0.025% to about 0.075% of the premix and between 3.6% to 7.2% total sucrose and sucrose equivalent content; and
   Further wherein the single phase dessert product consisting essentially of premix can be stored at a temperature of from −20 degrees Celsius to about −5 degrees Celsius, and wherein the single phase dessert product does not contain air.

23. A frozen dessert product comprising a single phase pellet consisting essentially of a premix, said premix containing no bulking agent, said premix comprising from 1.2% to 3.6% total sucrose and sucrose equivalent content, said pellet resulting from said premix being introduced into a cryogen, said pellet remaining a single phase solid product at a temperature of from between −20 and about −15 degrees Celsius without fusing to another pellet, and wherein the frozen dessert product does not contain air.

24. A frozen dessert product comprising a single phase pellet consisting essentially of a premix, said premix containing no bulking agent, said premix comprising from 0% to 1.2% total sucrose content, said pellet resulting from said premix being introduced into a cryogen, said pellet remaining a single phase solid product at a temperature of from between −20 and about −15 degrees Celsius without fusing to another pellet, and wherein the frozen dessert product does not contain air.

25. A frozen dessert product comprising a single phase pellet consisting essentially of a premix, said pellet being formed by introducing said premix into a cryogen as a small individual volume of liquid, said cryogen freezing said premix to form a single phase pellet, said pellet remaining in a solid phase at a temperature of from −20° C. to −5° C. without fusing to an adjacent pellet stored there with, and wherein the frozen dessert product does not contain air.

26. The frozen product according to claim 25 wherein the product can be stored at a temperature of −20° C. without agglomerating with adjacent pellets.

27. The frozen dessert product according to claim 25 where the product is structurally stable when stored in a retail or home freezer.

28. The frozen dessert product according to claim 25 wherein the storing and serving temperatures of the pellets is at a temperature range of −20 degrees Celsius and warmer.

29. The frozen dessert product according to claim 26 wherein the pellet is in a single phrase said single phase consisting essentially of a solid.

30. The frozen dessert product according to claim 25 wherein said pellet is solid between −20° C. and about −15° C.

31. The frozen dessert product according to claim 25 said pellet has a melting point between approximately to −10° C. about −6° C.

32. The frozen dessert product according to claim 25 wherein said pellet product can be stored in a conventional commercial freezer at a temperature range of −20C and warmer while maintaining a pelletized structure.

33. The frozen dessert product according to claim 25 wherein said pelletized dessert product can be stored in a home freezer having a temperature range of about −18° C. to −15° C. while maintaining a pelletized structure.

34. The frozen dessert product according to claim 25 wherein the pelletized frozen dessert product can be stored in a home fridge type freezer having a temperature range of about −10° C. to about −6° C. while maintaining a pelletized structure.

35. The frozen dessert product according to claim 25 wherein the pelletized frozen dessert product can be shipped in a commercial refrigerator freezer truck having a temperature of about −20° C. to −18° C. while maintaining a pelletized structure.

36. The frozen dessert product according to claim 25 wherein said frozen dessert product can be stored in a retail store freezer while maintaining a pelletized structure.

37. The frozen dessert product according to claim 36 wherein said frozen dessert product can be stored in a point of sale freezer for bulk frozen desserts while maintaining a pelletized structure.

38. The frozen dessert product according to claim 25 wherein the pelletized product is an ice cream, sorbet, water ice, ice milk, sherbert or frozen yogurt.

39. The frozen dessert product according to claim 1 wherein said pellet remaining in a pellet form at a temperature of up to −5° C. without fusing to another pellet.

40. The method of forming a single phase dessert product according to claim 9 wherein the single phase dessert product, can remain in a pellet form at a temperature of up to −5° C. without fusing to another pellet.

41. The frozen dessert product according to claim 20 wherein said pellet consists essentially of premix and remains a single phase product at a temperature of up to −5 degrees Celsius without fusing to another pellet.

42. The frozen dessert product according to claim 41 wherein said pellet remains a single phase product at temperatures from −20 degrees Celsius to −5 degrees Celsius without fusion to another pellet.

43. The method of forming a single phase dessert product according to claim 40 wherein said pellet remains a single phase product at temperatures from −20 degrees Celsius to −5 degrees Celsius without fusion to another pellet.

44. The frozen dessert product according to claim 39 wherein said pellet remains a single phase product at temperatures from −20 degrees Celsius to −5 degrees Celsius without fusion to another pellet.

* * * * *